US009278669B2

(12) United States Patent
Yoshida et al.

(10) Patent No.: US 9,278,669 B2
(45) Date of Patent: Mar. 8, 2016

(54) STEERING LOCK DEVICE

(71) Applicant: KABUSHIKI KAISHA TOKAI RIKA DENKI SEISAKUSHO, Aichi (JP)

(72) Inventors: Hiroshi Yoshida, Aichi (JP); Takumi Tamezane, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/563,252

(22) Filed: Dec. 8, 2014

(65) Prior Publication Data

US 2015/0158459 A1 Jun. 11, 2015

(30) Foreign Application Priority Data

Dec. 11, 2013 (JP) .................................. 2013-255994

(51) Int. Cl.
*B60R 25/02* (2013.01)
*B60R 25/021* (2013.01)

(52) U.S. Cl.
CPC ..... *B60R 25/02126* (2013.01); *Y10T 74/20648* (2015.01)

(58) Field of Classification Search
CPC .............. B60R 25/02153; B60R 21/05; B60R 25/0211; B60R 2011/0075; B60R 25/02
USPC .......................................... 70/182–186, 252
See application file for complete search history.

(56) References Cited

U.S. PATENT DOCUMENTS

| | | | | |
|---|---|---|---|---|
| 5,730,011 | A * | 3/1998 | Terai ................................ | 70/186 |
| 7,251,968 | B2 * | 8/2007 | Hasegawa ........................ | 70/186 |
| 7,703,309 | B2 * | 4/2010 | Okuno et al. .................... | 70/186 |
| 8,006,526 | B2 * | 8/2011 | Fort et al. ......................... | 70/186 |
| 8,141,397 | B2 * | 3/2012 | Nakamoto ........................ | 70/186 |
| 8,205,517 | B2 * | 6/2012 | Fukushima et al. ............. | 74/409 |
| 8,833,119 | B2 * | 9/2014 | Noma .............................. | 70/186 |
| 8,925,415 | B2 * | 1/2015 | Okada et al. .................... | 74/495 |
| 2002/0088257 | A1 * | 7/2002 | Dimig et al. .................... | 70/186 |
| 2005/0183476 | A1 * | 8/2005 | Feucht et al. .................... | 70/186 |
| 2010/0083716 | A1 * | 4/2010 | Fukatsu et al. .................. | 70/186 |
| 2012/0260701 | A1 * | 10/2012 | Okada et al. .................... | 70/183 |
| 2013/0067970 | A1 * | 3/2013 | Goshima ......................... | 70/187 |

FOREIGN PATENT DOCUMENTS

JP 2012-111294 A 6/2012

* cited by examiner

*Primary Examiner* — Suzanne Barrett
(74) *Attorney, Agent, or Firm* — Roberts Mlotkowski Safran & Cole, PC

(57) ABSTRACT

A steering lock device includes a lock body attached to a column post that rotatably supports a steering shaft, and a steering lock unit that restricts or releases a rotation of the steering shaft by turning a key cylinder unit housed in the lock body. The steering lock unit includes a locking bar engageable with the steering shaft, a lock stopper holding the locking bar, a camshaft to convert a rotary motion of the key cylinder unit into a linear motion of the lock stopper, and a lock holder configured such that the lock stopper, the cam shaft and the locking bar are installed therein by being inserted thereinto in a same direction.

8 Claims, 7 Drawing Sheets

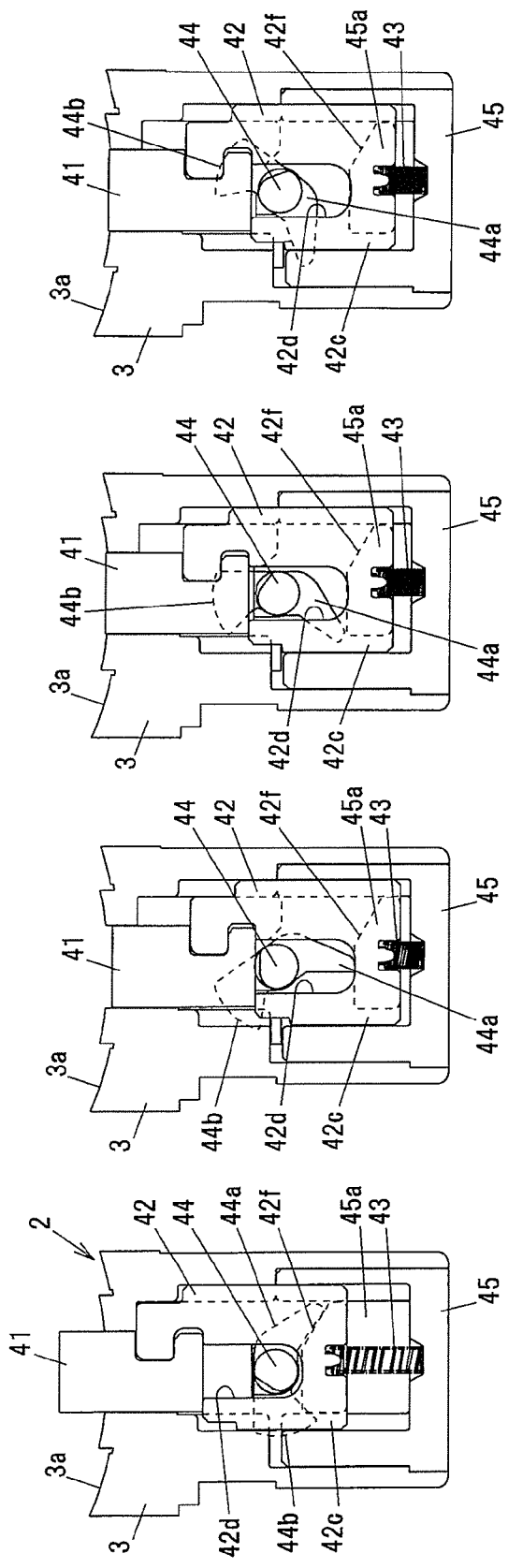

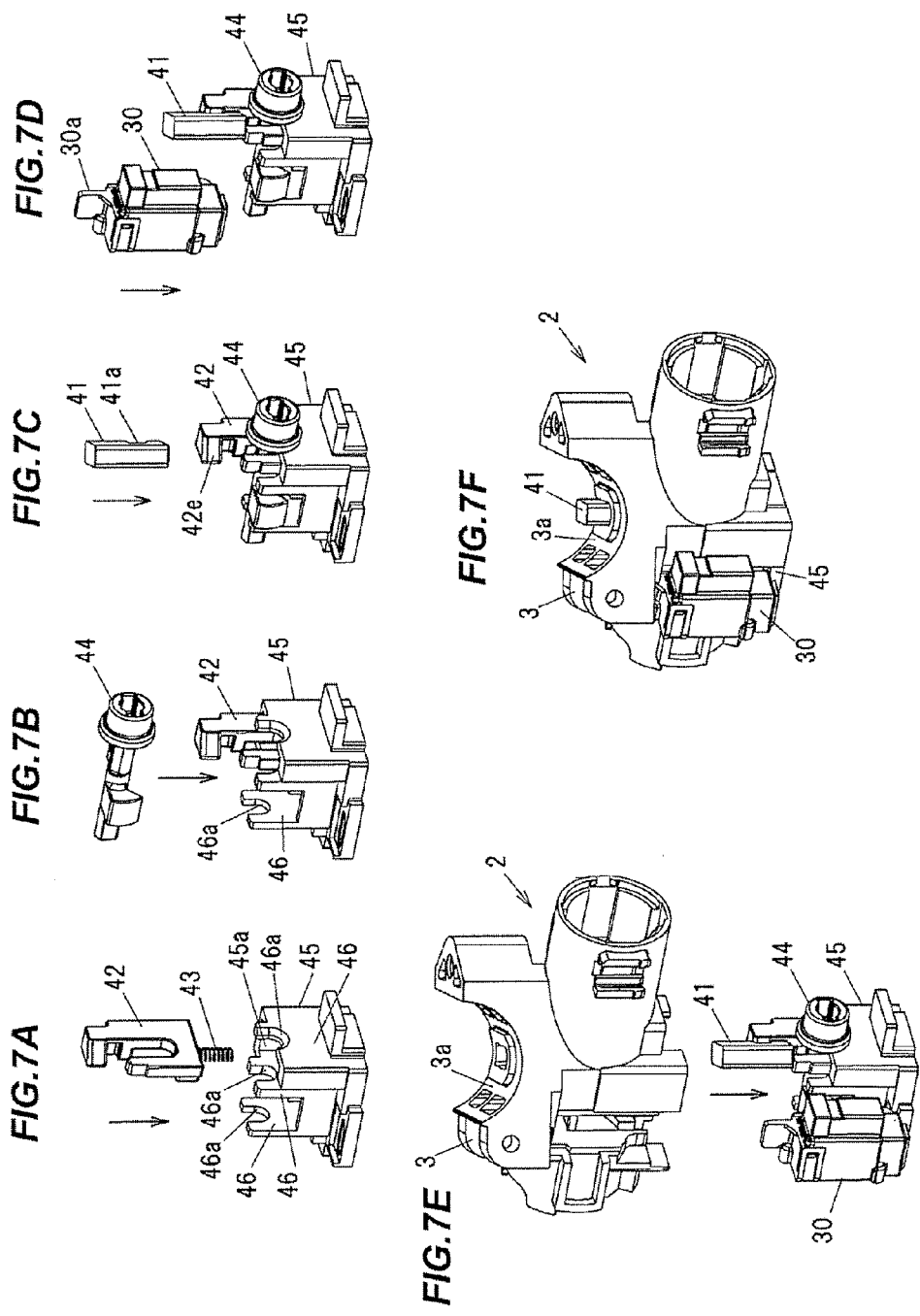

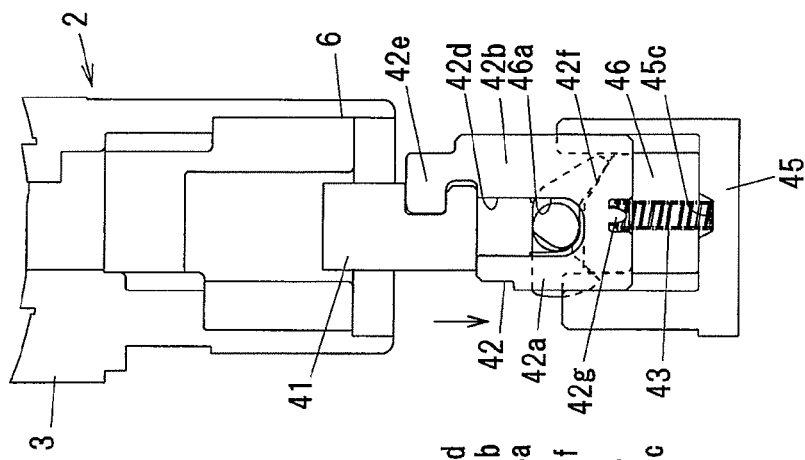
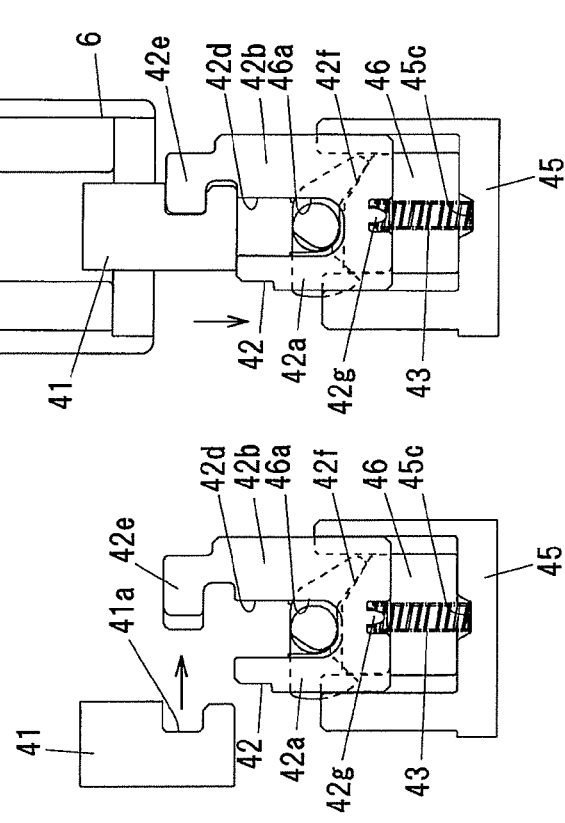
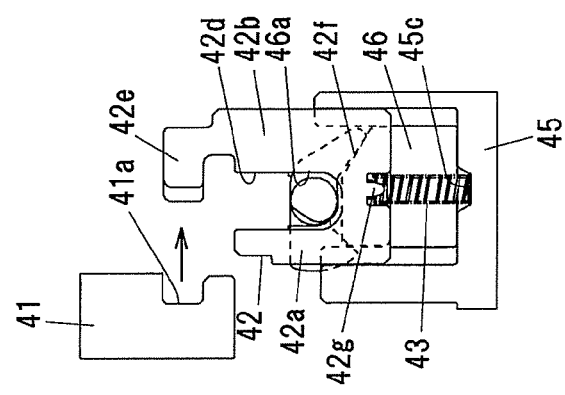
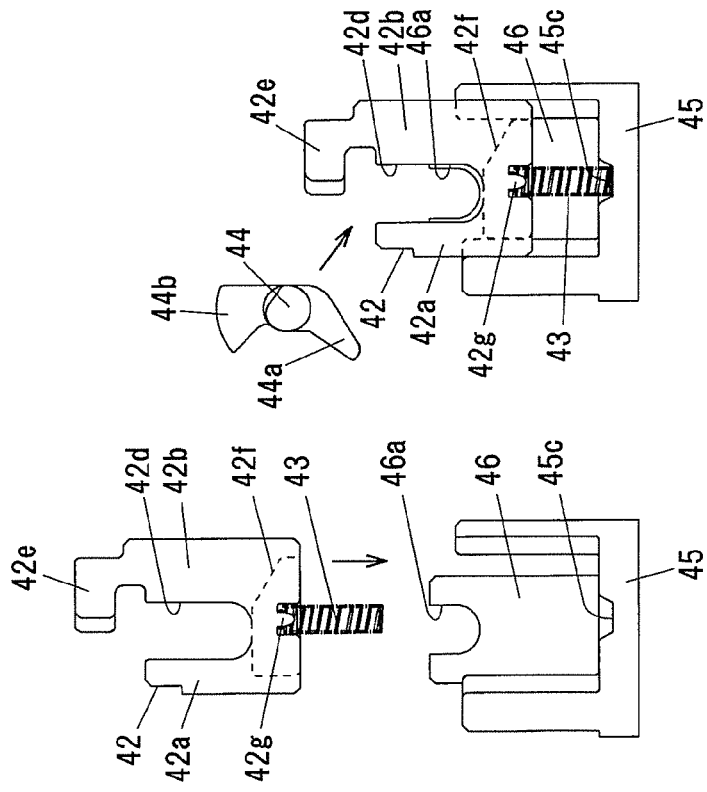

STEERING LOCK DEVICE

The present application is based on Japanese patent application No. 2013-255994 filed on Dec. 11, 2013, the entire contents of which are incorporated herein by reference.

BACKGROUND OF THE INVENTION

1. Field of the Invention

The invention relates to a steering (or steering wheel) lock device for locking rotation of a vehicle steering shaft.

2. Related Art

Vehicle steering systems are provided with a steering lock device for locking rotation of a steering shaft to prevent parked vehicles from motor vehicle theft (see e.g. JP-A-2012-111294).

The steering lock device disclosed in JP-A-2012-111294 has a structure in which a plug housed in a housing is rotationally operated and a locking piece is thereby moved in a direction substantially orthogonal to the rotational center of the plug and is engaged/disengaged with/from a steering shaft in a steering column.

The steering lock device is configured such that a lock stopper moves in a plane substantially orthogonal to a traveling direction of the locking piece and a mounting direction of the lock stopper coincides with that of the locking piece. Therefore, in component mounting work including work of mounting a spindle of the lock stopper, each component can be sequentially mounted in a stacking manner and work efficiency is thus improved.

SUMMARY OF THE INVENTION

The steering lock device disclosed in JP-A-2012-111294 is constructed such that only the lock stopper and the locking piece can be sequentially mounted in the housing in a stacking manner and the other components or constituent units such as camshaft cannot be attached in the housing in the same direction as the lock stopper and the locking piece. Therefore, there is a problem that the assembly process cannot be simplified and the productivity cannot be improved.

It is an object of the invention to provide a steering lock device that allows the simplification of the assembly process and improvement in the productivity.

(1) According to one embodiment of the invention, a steering lock device comprises:

a lock body attached to a column post that rotatably supports a steering shaft; and a steering lock unit that restricts or releases a rotation of the steering shaft by turning a key cylinder unit housed in the lock body, wherein the steering lock unit comprises a locking bar engageable with the steering shaft, a lock stopper holding the locking bar, a camshaft to convert a rotary motion of the key cylinder unit into a linear motion of the lock stopper, and a lock holder configured such that the lock stopper, the camshaft and the locking bar are installed therein by being inserted thereinto in a same direction.

In the above embodiment (1) of the invention, the following modifications and changes can be made.

(i) The lock stopper, the camshaft and the locking bar are collectively installed in the lock body by attaching the lock holder to the lock body.

(ii) The lock holder comprises a holding wall formed upright therein and comprising a notch for rotatably receiving the camshaft, and a space defined by the holding wall so as to house the lock stopper, the camshaft and the locking bar.

(iii) The lock stopper is movably housed in the lock holder and comprises a lock spring to push toward the steering shaft.

(iv) The lock stopper is configured to be movably arranged while straddling the camshaft in a recessed portion formed by left and right sidewalls and a lower sidewall coupling end portions of the left and right sidewalls, and wherein the lock stopper comprises a recess/protrusion engagement structure that a locking groove or locking protrusion formed on one of the left and right sidewalls is engaged with a locking protrusion or locking groove formed at an end of the locking bar.

(v) An interlocking unit for preventing a reverse rotation of the key cylinder unit is installed in the lock holder by being inserted thereinto in the same direction as the lock stopper, the camshaft and the locking bar.

Advantageous Effects of the Invention

According to one embodiment of the invention, a steering lock device can be provided that allows the simplification of the assembly process and improvement in the productivity.

BRIEF DESCRIPTION OF THE DRAWINGS

Next, the present invention will be explained in more detail in conjunction with appended drawings, wherein:

FIGS. 5A to 5D are cross sectional views showing the main portion taken on line of FIG. 1 when viewed from an arrow direction to explain an operation of the steering lock device, where a steering lock unit is located at a LOCK position in FIG. 5A, at an ACC position in FIG. 5B, at an ON position in FIG. 5C and at a START position in FIG. 5D;

FIGS. 7A to 7F are perspective views showing the main portion to explain the procedure of attaching the steering lock unit; and FIGS. 8A to 8D are cross sectional views showing the main portion taken on line of FIG. 1 when viewed from an arrow direction to explain the procedure of attaching the steering lock unit.

DETAILED DESCRIPTION OF THE PREFERRED EMBODIMENT

A preferred embodiment of the invention will be specifically described below in conjunction with the appended drawings.

Configuration of Steering Lock Device

Figure 1:
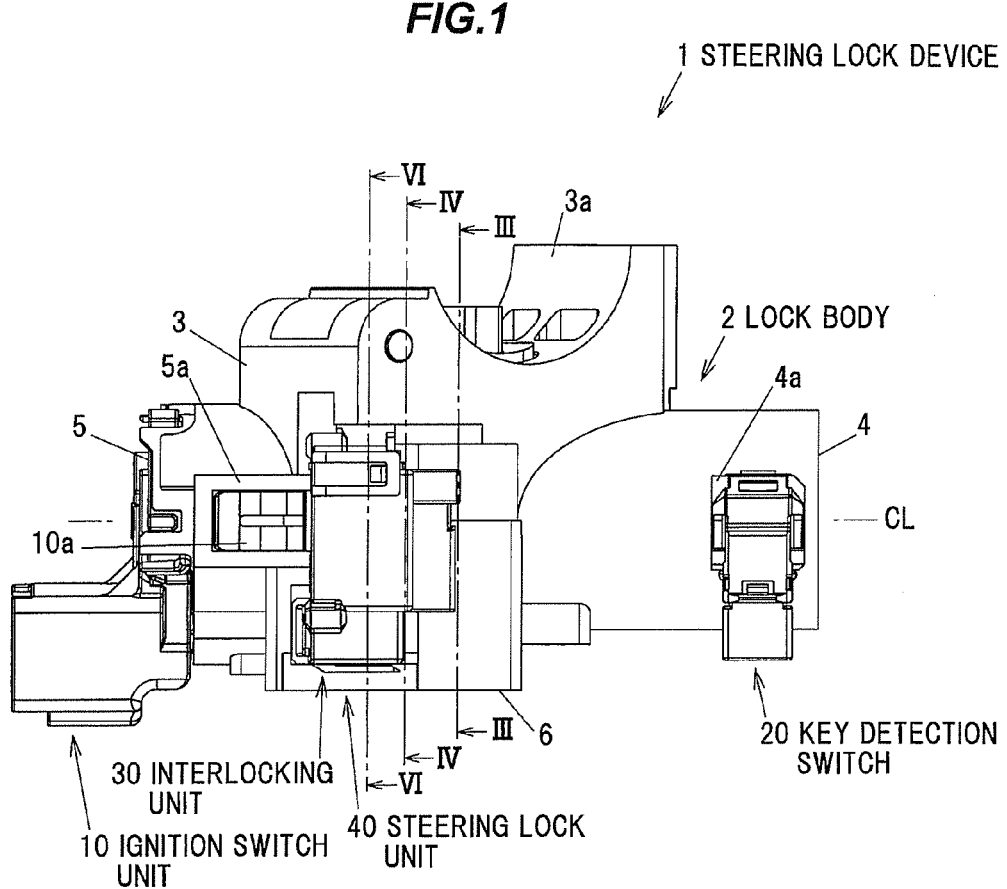
FIG. 1 is a schematic plan view showing a steering lock device in a preferred embodiment of the present invention.

FIG. 1 schematically shows a configuration of a vehicle steering lock device indicated generally by the reference numeral 1. The steering lock device 1 is provided with a lock body 2 formed as one piece of a metal material, e.g., zinc die-cast. The lock body 2 is formed of a block-shaped cylinder which is long in a direction crossing the axial direction of a steering shaft (not shown).

Figure 2:
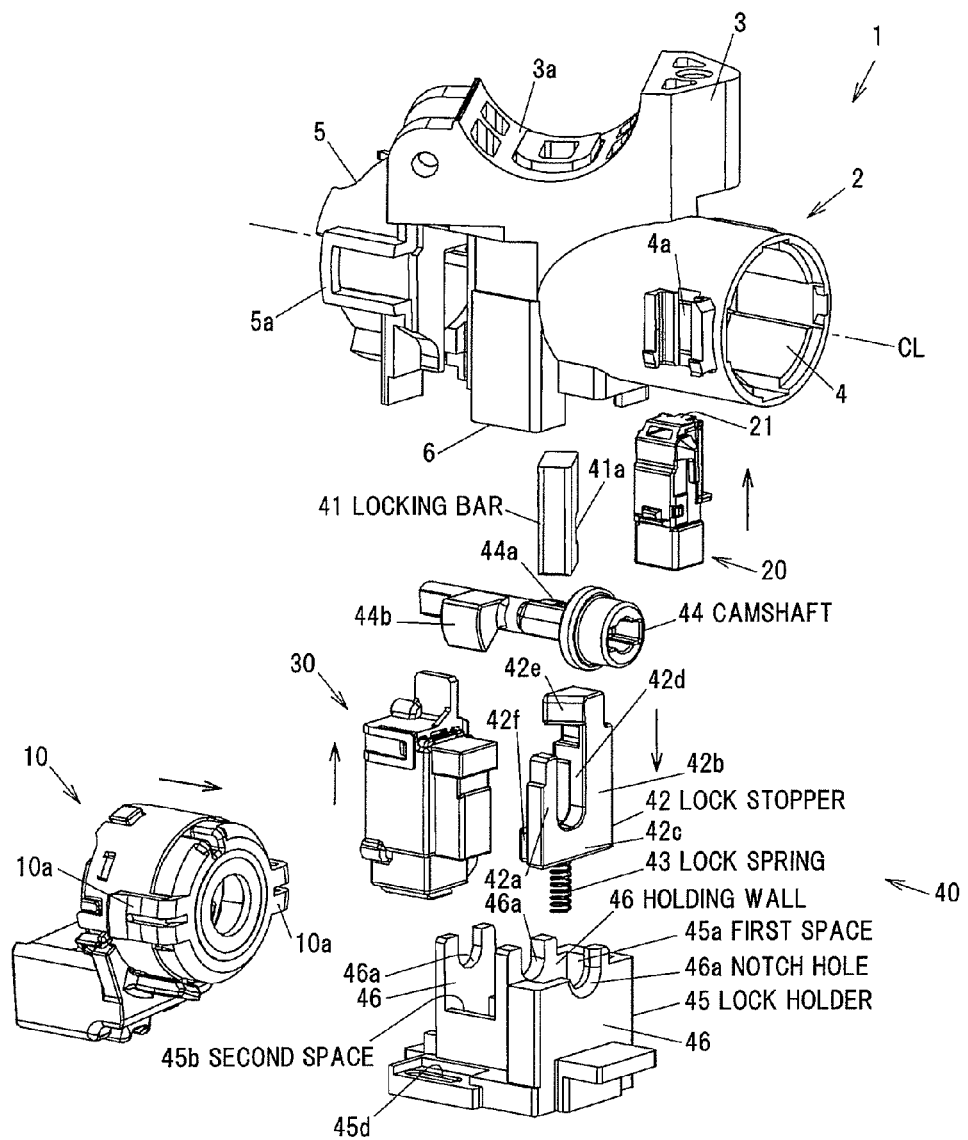
FIG. 2 is a schematic exploded perspective view showing the steering lock device in the embodiment.

As shown in FIGS. 1 and 2, the lock body 2 is provided with a lock body attachment portion 3 used for attachment to a column post which rotatably houses the steering shaft. The lock body attachment portion 3 has an arcuate fitting recess 3a formed at a predetermined inclination angle with respect to a central axis line CL of the lock body 2 and is fixed to the column post by fitting the fitting recess 3a to the outer peripheral surface of the column post and then tightening bolts via a bracket.

A first housing portion 4 having a cylindrical shape for housing a key cylinder unit (not shown) is provided on one side of the lock body attachment portion 3, as shown in FIGS. 1 and 2. A second housing portion 5 for attaching an engine-driving ignition switch unit 10 is provided on another side of the lock body attachment portion 3. A key detection switch 20 is attached to a side surface of the first housing portion 4.

The key cylinder unit is provided with a mechanical key and a key cylinder capable of mechanical authentication. The key cylinder is configured to be rotatably operable by the mechanical key inserted into a key insertion hole in, e.g., a clockwise direction from LOCK position to three lock release positions—an ACC (accessory) position, an ON position and a START position—when viewing the key insertion hole from the front side.

The ignition switch unit 10 has a mechanism to perform a switching operation in conjunction with a rotating operation of the key cylinder unit by the mechanical key and switches the contact point connection status between "LOCK", "ACC", "ON" and "START" so as to correspond the LOCK position, the ACC position, the ON position and the START position of the key cylinder unit. The status of various in-vehicle devices and the engine is switched based on the connection status of the ignition switch unit 10.

The key detection switch 20 is a switch for detecting presence of the mechanical key in the key insertion hole of the key cylinder and is used as, e.g., a switch for preventing a key from being left in the key cylinder by detecting the insertion/extraction state of the mechanical key into/from the key cylinder.

Inside the lock body attachment portion 3, a third housing portion 6 having a square cylindrical shape is provided to house a steering lock unit 40 which restricts or releases rotation of the steering shaft, as shown in FIGS. 1 and 2. In the third housing portion 6, an interlocking unit 30 and the steering lock unit 40 are attached in the same direction.

The interlocking unit 30 has a mechanism to prevent reverse rotation of the key cylinder unit. The key cylinder of the key cylinder unit is restricted from being rotationally operated from the ACC position to the LOCK position in a state that the gear range selected by a shift lever is not Park, and this prevents an incorrect operation which causes reverse rotation of the key cylinder from the ACC position to the LOCK position.

Configuration of Steering Lock Unit

As shown in FIG. 2, the steering lock unit 40 is provided with a locking bar 41 engageable with (or disengageable from) the steering shaft, a lock stopper 42 holding the locking bar 41, a lock spring 43 for pressing the locking bar 41 toward the steering shaft, a camshaft 44 converting rotary motion of the key cylinder produced by operating the mechanical key into linear motion of the lock stopper 42, and a bottomed-cylindrical lock holder 45 for holding such internal components.

A main feature of the steering lock device 1 is that the lock stopper 42, the lock spring 43, the camshaft 44 and the locking bar 41 can be attached to the lock holder 45 in the same direction as shown in FIG. 2, and another main feature is that the steering lock unit 40 and the interlocking unit 30 can be collectively attached to the third housing portion 6 of the lock body 2 in one direction.

Figure 3:
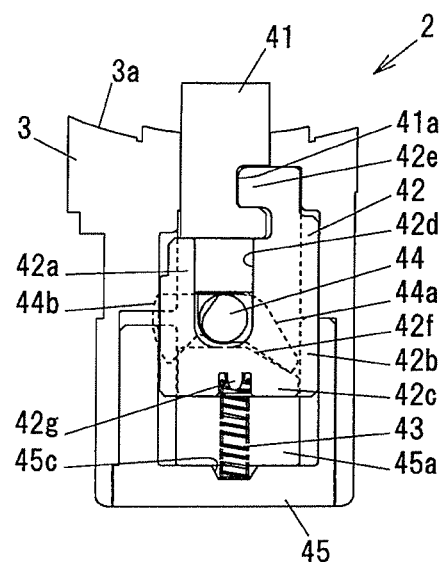
FIG. 3 is a cross sectional view showing a main portion taken on line of FIG. 1 when viewed from an arrow direction.

The locking bar 41 is a long-bar-shaped steering lock member formed of a highly rigid metal material and a locking groove 41a for locking the lock stopper 42 is formed at an end portion of the lock member, as shown in FIGS. 2 and 3.

The lock stopper 42 has left and right sidewalls 42a and 42b and a lower sidewall 42c coupling end portions of the right sidewalls 42a and 42b, as shown in FIGS. 2 and 3. A recessed portion 42d formed on the sidewall (42a, 42b and 42c) is configured to allow the lock stopper 42 to move while straddling a shaft portion of the camshaft 44. The right sidewall 42b is longer than the left sidewall 42a and a locking protrusion 42e locked in the locking groove 41a of the locking bar 41 is formed on a surface of the right sidewall 42b facing the left sidewall.

Figure 4:
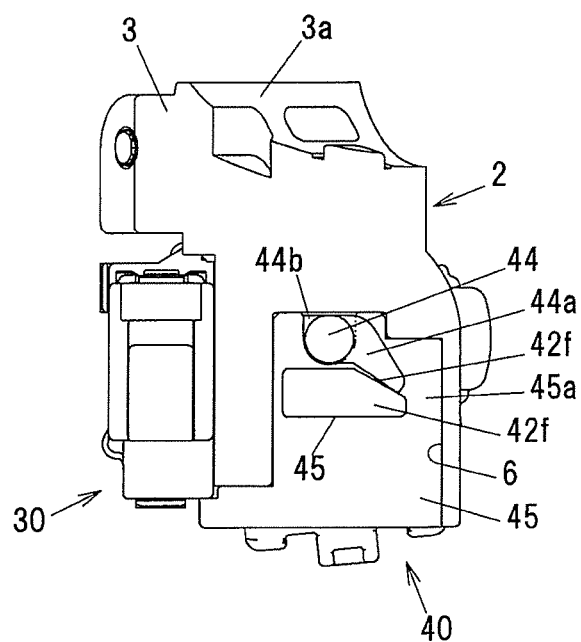
FIG. 4 is a cross sectional view showing the main portion taken on line IV-IV of FIG. 1 when viewed from an arrow direction.

A cam follower 42f is raised from an inner bottom surface of the lower sidewall 42c of the lock stopper 42 as shown in FIGS. 2 to 4 to advance and retract the locking bar 41 via the camshaft 44 along with the rotating operation of the key cylinder. Meanwhile, a spring support protrusion 42g for supporting an end portion of the lock spring 43 is provided to protrude from an outer bottom surface of the lower sidewall 42c of the lock stopper 42.

On the shaft portion of the camshaft 44, a first cam portion 44a for moving the lock stopper 42 back and forward via the lock spring 43 along with the rotating operation of the key cylinder and a second cam portion 44b to be restricted from rotating by the interlocking unit 30 are formed in a protruding manner with a predetermined topological difference, as shown in FIGS. 2 to 4.

As shown in FIGS. 2 to 4, the lock holder 45 is configured that the inside thereof is partitioned by holding walls 46 which hold the camshaft 44. The inner space of the lock holder 45 is divided into first and second spaces 45a and 45b by the holding walls 46. A concave notch hole 46a for rotatably holding the camshaft 44 is provided on an end face of each holding wall 46 by drilling so as to be opened in a direction crossing the facing surfaces of the pair of holding walls 46 which define the second space 45b.

As shown in FIGS. 2 to 4, a spring support recess 45c for supporting the lock spring 43 is formed on the bottom surface of the lock holder 45 in the first space 45a and the lock stopper 42 is housed in the first space 45a via the lock spring 43. Meanwhile, the second cam portion 44b of the camshaft 44 is housed in the second space 45b.

In the state that the key cylinder unit is located at the LOCK position, the first cam portion 44a of the camshaft 44 is stationary on a cam surface of the cam follower 42f of the lock stopper 42 due to an elastic force of the lock spring 43 as shown in FIG. 5A and the camshaft 44 is held on the bottom surfaces of the notch holes 46a of the holding walls 46. The locking bar 41 protrudes out from the lock body attachment portion 3 of the lock body 2 toward the column post, thereby locking the rotation of the steering shaft.

In the process of rotation of the key cylinder unit from the LOCK position through the ACC position to the ON or START position, the first cam portion 44a of the camshaft 44 rotates along the cam surface of the cam follower 42f of the lock stopper 42 against the elastic force of the lock spring 43, as shown in FIGS. 5B to 5D.

Along with the rotation of the first cam portion 44a of the camshaft 44, the lower sidewall 42c of the lock stopper 42 moves in a direction separating from the camshaft 44 against the elastic force of the lock spring 43, as shown in FIGS. 5B to 5D. The locking bar 41 is retracted into the lock body attachment portion 3 of the lock body 2 along with the movement of the lock stopper 42 and the rotation of the steering shaft is thereby unlocked.

Figure 6A:
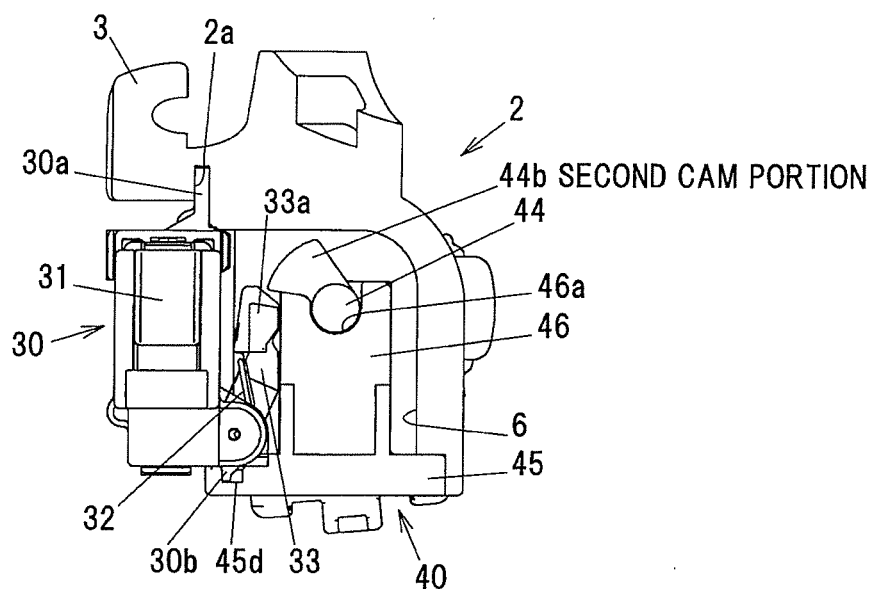
FIGS. 6A and 6B are cross sectional views showing the main portion taken on line VI-VI of FIG. 1 when viewed from an arrow direction to explain an operation of the steering lock device, where the steering lock unit is located at the ACC position in FIG. 6A and at the LOCK position in FIG. 6B.
Figure 6B:
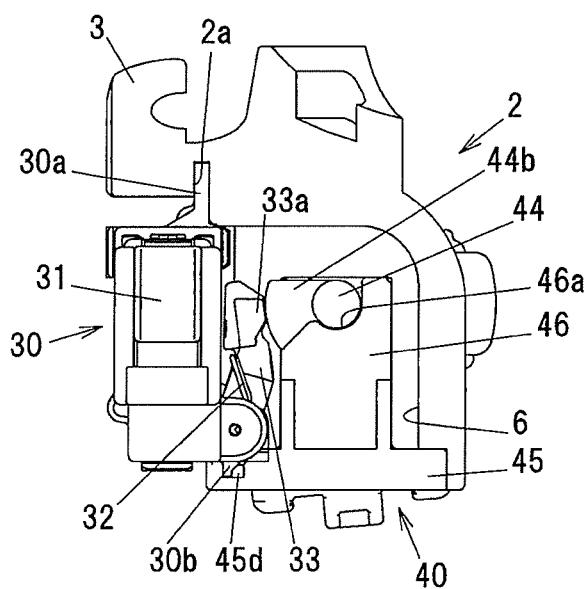

Meanwhile, the rotation of the camshaft 44 is restricted by the interlocking unit 30 depending on the shift position of the shift lever of the vehicle. As shown in FIGS. 6A to 6B, the interlocking unit 30 is provided with a lock link 33 receiving an elastic force of a torsion spring 32 in the demagnetized state of an electromagnetic solenoid 31 and a restricting end portion 33a formed at an end portion of the lock link 33 is arranged insertable/extractable into/from a locus of rotation of the second cam portion 44b of the camshaft 44.

When the shift lever of the vehicle is located at a shift position other than the parking range in the state that the key cylinder unit is located at the ACC position, the elastic force of the torsion spring 32 is applied to the lock link 33 due to demagnetization of the electromagnetic solenoid 31 and the restricting end portion 33a of the lock link 33 is arranged in the locus of rotation of the second cam portion 44b of the camshaft 44, as shown in FIG. 6A. Since the restricting end portion 33a of the lock link 33 restricts the second cam portion of the camshaft 44 from rotating in a direction of returning from the ACC position to the LOCK position, the rotating operation of the mechanical key in a direction of returning from the ACC position to the LOCK position is locked.

When the shift lever of the vehicle is located at the shift position in the parking range, the electromagnetic solenoid 31 is energized and the restricting end portion 33a of the lock link 33 is thereby retracted from the locus of rotation of the second cam portion 44b of the camshaft 44 against the elastic force of the torsion spring 32, as shown in FIG. 6B. Thus, restriction of rotation of the second cam portion 44b of the camshaft 44 is released.

Assembly of Steering Lock Unit

The steering lock device 1 configured as described above is effectively assembled by a lock component assembling process and a lock unit assembling process. In the lock component assembling process, all of the lock components including the camshaft 44 which constitute the steering lock unit 40 are attached to the lock holder 45 in the same direction. In the lock unit assembling process, the steering lock unit 40 assembled in the lock component assembling process is attached to the lock body 2 in the same direction as the direction of assembling the lock components.

Referring to FIGS. 7A to 7F and 8A to 8D, a procedure for the process of assembling the lock components constituting the steering lock unit 40 and a procedure for the process of assembling the lock units are respectively shown as an example. FIGS. 7A to 7F are perspective views of the main portions, wherein FIGS. 7A to 7D show the lock component assembling process and FIGS. 7E and 7F show the lock unit assembling process. FIGS. 8A to 8D are cross sectional views of the main portions, wherein 8A to 8C show the lock component assembling process corresponding to FIGS. 7A to 7D and FIG. 8D shows the lock unit assembling process corresponding to FIG. 7E.

Assembly Process of Lock Components

In the lock component assembling process, firstly, the lock stopper 42 supporting an end portion of the lock spring 43 is attached to the lock holder 45 inside the first space 45a from the lock spring 43 side, as shown in FIGS. 7A and 8A.

Next, the camshaft 44 is attached to the notch holes 46a of the holding walls 46 of the lock holder 45 in the attaching direction which is the same as a direction along an operating axis of the lock stopper 42, as shown in FIGS. 7B and 8B.

Next, after the locking bar 41 is attached in the same direction as the direction of attaching the camshaft 44 as shown in FIGS. 7C and 8C, the locking protrusion 42e of the lock stopper 42 is locked in the locking groove 41a of the locking bar 41.

Through the above assembly work, an assembly of the lock components constituting the steering lock unit 40 is completed. Then, the process proceeds to the lock unit assembling process.

Assembly Process of Lock Unit

In the lock unit assembling process, the interlocking unit 30 is attached to the lock holder 45 in the same direction as the direction of attaching the lock components constituting the steering lock unit 40, as shown in FIG. 7D.

The lock unit assembly composed of the steering lock unit 40 and the interlocking unit 30 is attached to the third housing portion 6 of the lock body 2 in the same direction as the direction of attaching the lock components, as shown in FIGS. 7E and 7F.

On the interlocking unit 30, a locking protrusion 30a is configured to protrude from a surface facing the lock body and a locking protrusion 30b is configured to protrude from a surface facing the lock holder, as shown in FIG. 6A. The locking protrusion 30a is locked in a locking hole 2a formed on the lock body 2 and the locking protrusion 30b is locked in a locking hole 45d formed on the bottom surface of the lock holder 45 on the outer side.

Through the above assembly work, the interlocking unit 30 is sandwiched between and fixed by the lock body 2 and the lock holder 45. The lock body 2 and the lock holder 45 are fixed by a fixing means, e.g., coupling pins or heat crimping tabs, etc.

Assembly Process of Other Constituent Units and Components

Besides the steering lock unit 40 and the interlocking unit 30, the ignition switch unit 10 and the key detection switch 20 are attached to the lock body 2.

A pair of elastically deformable locking pawls 10a are formed on a side surface of the ignition switch unit 10, as shown in FIGS. 1 and 2. A pair of brackets 5a to be coupled to the pair of the locking pawls 10a by snap-fitting are formed on a side surface of the second housing portion 5 of the lock body 2, hence, the ignition switch unit 10 is attached to the lock body 2 by snap-fit coupling.

As shown in FIGS. 1 and 2, a sliding raised portion 21 having a dovetail shape is formed on the key detection switch 20. A sliding recess 4a having a dovetail groove shape is formed on a side surface of the first housing portion 4 of the lock body 2. The key detection switch 20 is attached to the lock body 2 by slidably coupling the sliding raised portion 21 to the sliding recess 4a. Note that, the key cylinder unit (illustration omitted) is press-fitted and fixed to the first housing portion 4 of the lock body 2.

Effects of the Embodiment

The steering lock device 1 configured as described above exerts the following effects in addition to the above-mentioned effects.

(1) It is possible to sequentially attach various lock components constituting the steering lock unit 40 in the same direction and this allows the assembly man-hour and the manufacturing cost to be reduced.

(2) Since all lock components can be attached in the same direction, it is not necessary to change the direction of each lock component and it is thus possible to simplify the assembly structure and facilities.

(3) Since the assembly structure is simple, it is easy to assemble and it is thus possible to automate using automated robots.

Although the steering lock device 1 of the invention have been described based on the embodiment and examples, the invention is not to be limited to the embodiment and examples as obvious from the above description, and can be implemented in various forms without departing from the gist thereof.

It should be noted that all combinations of the features described in the embodiment and examples are not necessary to solve the problem of the invention.

What is claimed is:

1. A steering lock device, comprising:
    a lock body attached to a column post that rotatably supports a steering shaft; and
    a steering lock unit that restricts or releases a rotation of the steering shaft by turning a key cylinder unit housed in the lock body,
    wherein the steering lock unit comprises a locking bar engageable with the steering shaft, a lock stopper holding the locking bar, a camshaft to convert a rotary motion of the key cylinder unit into a linear motion of the lock stopper, and a lock holder configured such that the lock stopper, the cam shaft and the locking bar are installed therein by being inserted thereinto in a same direction,
    wherein an interlocking unit for preventing a reverse rotation of the key cylinder unit is installed in the lock holder by being inserted thereinto in the same direction as the lock stopper, the camshaft and the locking bar.

2. The steering lock device according to claim 1, wherein the lock stopper, the camshaft and the locking bar are collectively installed in the lock body by attaching the lock holder to the lock body.

3. The steering lock device according to claim 1, wherein the lock holder comprises a holding wall formed upright therein and comprising a notch for rotatably receiving the camshaft, and a space defined by the holding wall so as to house the lock stopper, the camshaft and the locking bar.

4. The steering lock device according to claim 2, wherein the lock holder comprises a holding wall formed upright therein and comprising a notch for rotatably receiving the camshaft, and a space defined by the holding wall so as to house the lock stopper, the camshaft and the locking bar.

5. The steering lock device according to claim 1, wherein the lock stopper is movably housed in the lock holder and comprises a lock spring to push toward the steering shaft.

6. The steering lock device according to claim 2, wherein the lock stopper is movably housed in the lock holder and comprises a lock spring to push toward the steering shaft.

7. The steering lock device according to claim 1, wherein the lock stopper is configured to be movably arranged while straddling the camshaft in a recessed portion formed by left and right sidewalls and a lower sidewall coupling end portions of the left and right sidewalls, and wherein a locking groove or locking protrusion formed on one of the left and right sidewalls of the lock stopper is engaged with a locking protrusion or locking groove formed at an end of the locking bar.

8. The steering lock device according to claim 2, wherein the lock stopper is configured to be movably arranged while straddling the camshaft in a recessed portion formed by left and right sidewalls and a lower sidewall coupling end portions of the left and right sidewalls, and wherein the lock stopper comprises a recess/protrusion engagement structure that a locking groove or locking protrusion formed on one of the left and right sidewalls is engaged with a locking protrusion or locking groove formed at an end of the locking bar.

* * * * *